United States Patent [19]

Hamaguchi

[11] Patent Number: 4,862,626
[45] Date of Patent: Sep. 5, 1989

[54] METHOD OF CAUSING FISH TO GATHER

[75] Inventor: Ukio Hamaguchi, Toba, Japan

[73] Assignee: Hamaguchi Keiki Kogyo Kabushiki Kaisha, Mie, Japan

[21] Appl. No.: 315,585

[22] Filed: Feb. 27, 1989

[30] Foreign Application Priority Data

Apr. 28, 1988 [JP] Japan .................... 63-106131

[51] Int. Cl.$^4$ .......................... A01M 31/06
[52] U.S. Cl. ......................................... 43/4.5
[58] Field of Search ............................. 43/4, 4.5

[56] References Cited

U.S. PATENT DOCUMENTS 4,471,552 9/1984 McIntosh et al. .................. 43/4
4,550,518 11/1985 Layson ............................ 43/4

OTHER PUBLICATIONS

Explor. Mer, vol. 31, No. 3, pp. 427–434 Copenhague, Jan. vier 1968, *Field Experiment on the Attraction of Pelagic Fish to Floating Objects*, by John R. Hunter and Charles Mitchell.
Fishery Bulletin, vol. 66, No. 1, pp. 13–29, *Association of Fishes with Flotsam in the Offshore Waters of Central America* by John Hunter et al.
Transactions of the American Fisheries Society, vol. 100, No. 1, pp. 86–99, Jan. 1971, *Attraction of Coastal Pelagic Fishes with Artificial Structures*, by Edward Klima et al.
Pacific Science, vol. XXI, No. 4, Oct. 1967, pp. 486–497, *Ecological Significance of a Drifting Object to Pelagic Fishes* by Reginald Gooding et al.

Primary Examiner—H. Jordan
Attorney, Agent, or Firm—Oliff & Berridge

[57] ABSTRACT

A model having a pattern of spots and stripes similar to those of the whale shark is tugged by a boat, or anchored in a rocky place under the water where fish tend to gather, or is allowed to float on the sea, to let skipjacks or tunnies gather around the model, thus forming a shoal of fish around the model.

5 Claims, 3 Drawing Sheets

4,862,626

METHOD OF CAUSING FISH TO GATHER

BACKGROUND OF THE INVENTION

1. Field of the Invention

This invention relates to a method of causing fish, utilized for fishing, to gather and, more particularly, to a method of causing fish such as skipjacks and tunnies to gather.

2. Description of Related Art

It is well known in the art that fish have a running character, i.e., a character to move in a given direction in reaction to external excitement or stimuli, and it has been extensively practiced to cause fish to gather by utilizing the running character of fish in reaction in light, water current, bait, etc., for the purpose of fishing. Fish further have a habit of gathering toward certain objects in a shoal, and there are known shoals which form around wood, sharks, whales, etc. It has also been a practice to fish around an object or target in which fish gather.

Of the running characters noted above, only the character in reaction to bait, i.e., character to move toward bait, has heretofore been utilized to cause gathering of skipjacks and tunnies. The other running characters or habits of fish to gather toward objects have not been utilized or practiced.

The method of causing fish to gather utilizing the running character of the fish in reaction to bait, however, requires fresh bait. Particularly, skipjacks absolutely require sardines as live bait, the maintenance of which requires great cost. Further, skipjacks or tunnies move in wide fishing areas, and with only utilizing baits, it is difficult to cause gathering to catch the number of fish desired. This particular problem is intensified due to various countries recently setting two-hundred-nautical-mile fishing area limits in view of preserving natural resources and securing economic profits. Therefore, it is important to establish an effective method of fishing in view of the diminishing fishing areas.

SUMMARY OF THE INVENTION

The invention has been considered in view of the above background, and its object is to provide a method of causing fish to gather, and more particularly to causing gathering of skipjacks or tunnies.

To attain the above object and other objects of the invention, the character of skipjacks or tunnies to gather around a whale shark is utilized, and there is provided a method of causing fish to gather by using a whale shark model having a spots or stripes pattern similar to that of a whale shark, said model floating in or on the sea such that skipjacks or tunnies are permitted to gather around it.

According to the invention, the size and shape of the model are not limited, but are desirably close to those of the standard body of a whale shark familiar to the skipjack. Further, it is desired to provide the model with dorsal and caudal fins to simulate the whale shark more closely. The model may be formed in the form of a sack, which is provided at suitable positions with holes so that sea water can flow through it. The model may be formed by any suitable method. For example, a woven or non-woven textile cloth of synthetic fiber comprising polyester, polyamide, polypropylene, etc. may be provided with printing or dying of a spots or stripes pattern similar to that of the whale shark, followed by suitable cutting and sewing. It is of course possible to use a plastic sheet in lieu of the woven or non-woven cloth. Further, all or a part of the model may be of a resin molding.

According to the invention, the model may be held in or on the sea water in any desired manner. For example, it may be tugged by a fishing boat or anchored in a rocky place under the water where fish tend to gather, or it may be merely allowed to float on the sea.

Further, the method of causing fish to gather according to the invention is suitable for trawl fishery as shown in FIG. 5 and, of course, may be utilized for various fishing methods, e.g., the pole-and-line, longlining and round haul netting.

In the method of causing fish to gather together as described above, skipjacks or tunnies gather around the floating model such as a whale shark to form a shoal around the whale shark to permit effective fishing. Further, the cumbersome scattering of bait may be dispensed with or substantially dispensed with, and the cost of maintenance of bait can be greatly reduced.

DETAILED DESCRIPTION OF THE INVENTION

An embodiment of the invention will now be described with reference to the drawings.

Figure 1:
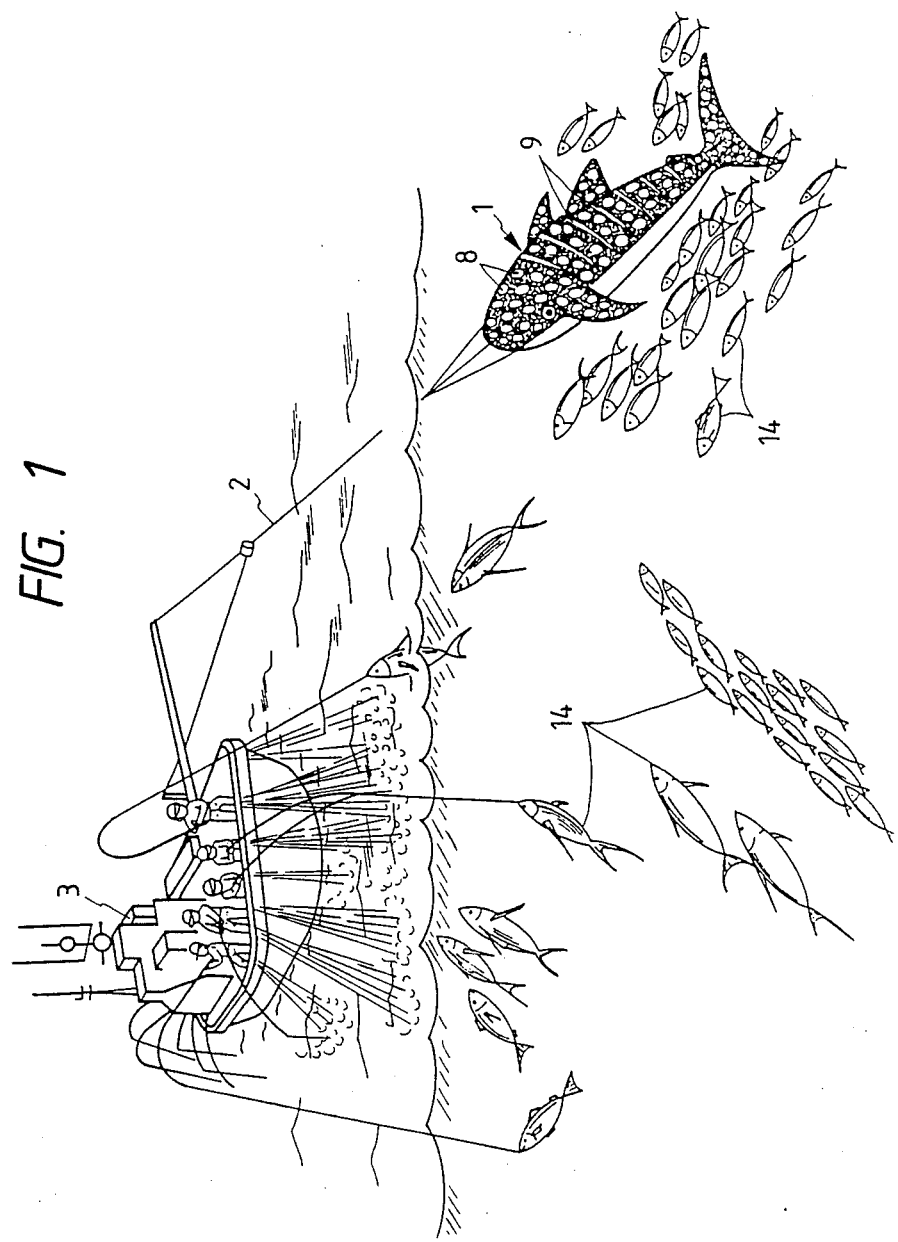
FIG. 1 is a pictorial perspective view illustrating an embodiment of the method of causing fish to gather according to the invention.

FIG. 1 is a view showing an embodiment of the method of causing fish to gather according to the invention applied to the pole-and-line fishing of skipjacks. In FIG. 1, reference numeral 1 designates a model of a whale shark. The model 1 is coupled by a wire 2 connected to a fishing boat 3.

Figure 2:
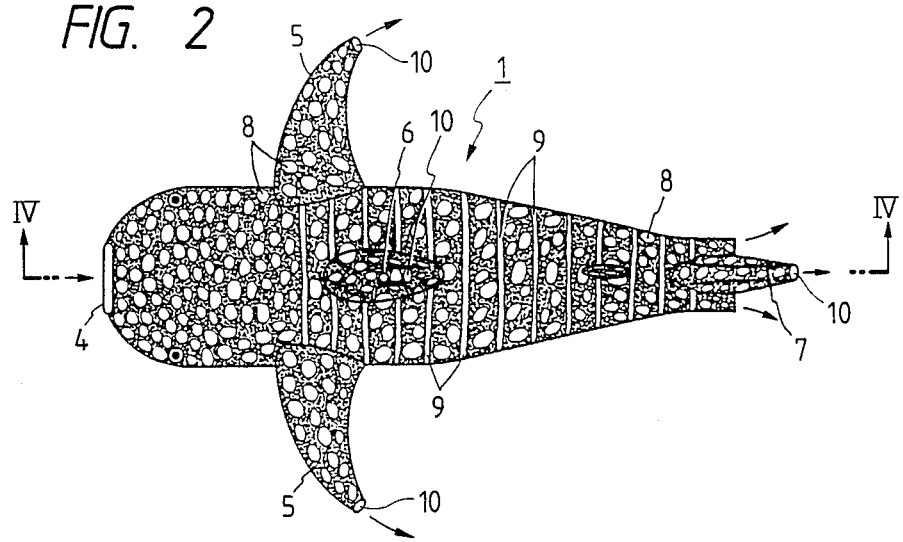
FIG. 2 is a plan view showing a model of a whale shark used according to the invention.
Figure 3:
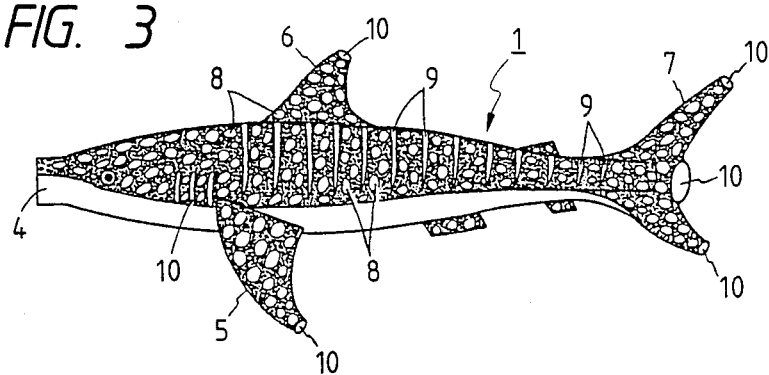
FIG. 3 is a front view showing the same model of the whale shark.
Figure 4:
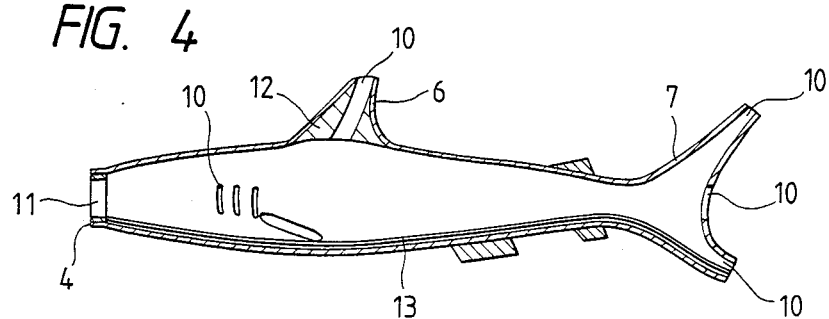
FIG. 4 is a sectional view taken along line IV—IV shown in FIG. 2.
Figure 5:
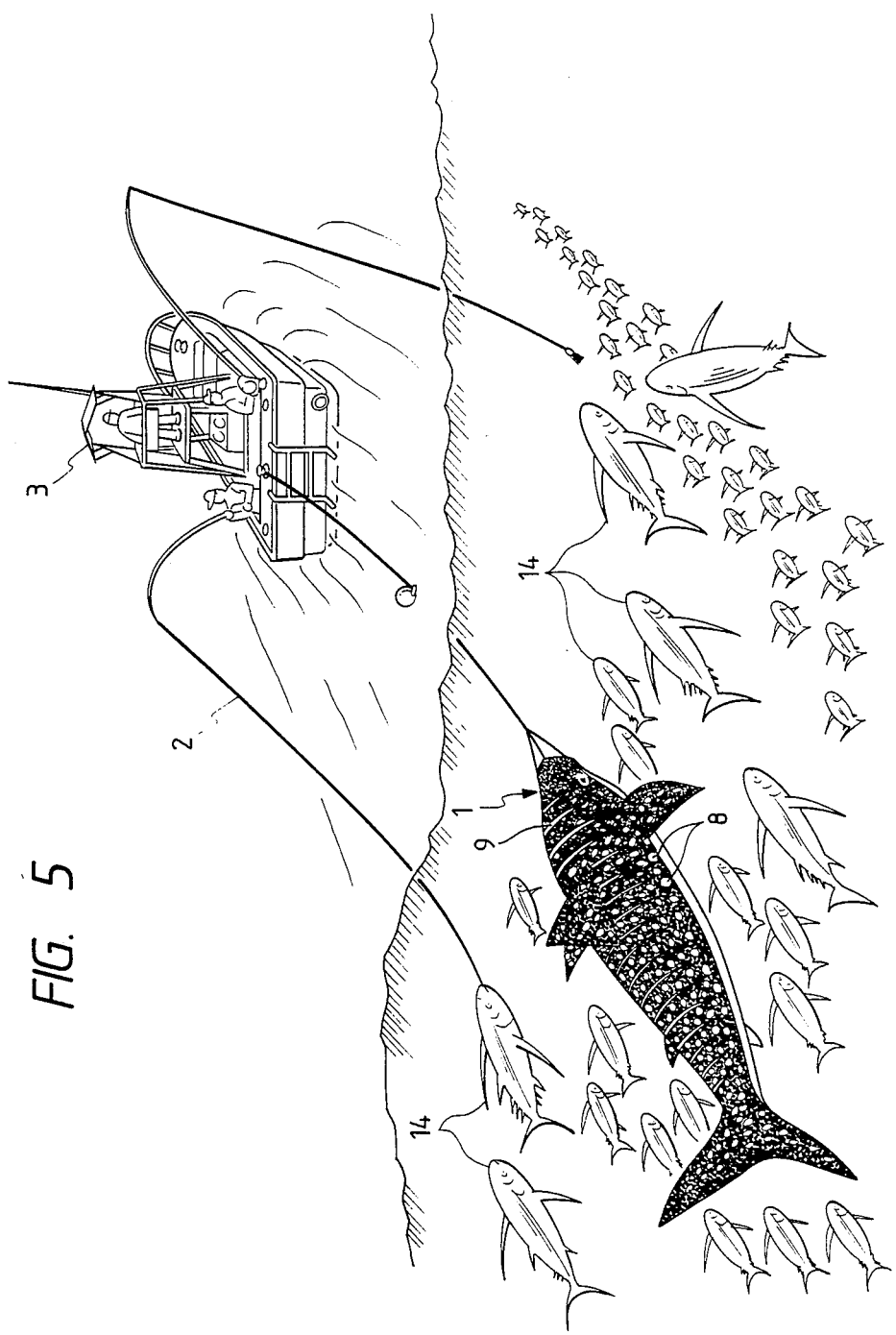
FIG. 5 is a pictorial perspective view illustrating another embodiment of the method of causing fish to gather according to the invention.

The model 1, as shown in FIGS. 2 to 4, has a mouth 4, pectoral fins 5, dorsal fin 6 and caudal fin 7 similar to those of the whale shark, and its entire surface has spots 8 and stripes 9 in a pattern similar to that of the whale shark. The model 1 is in the form of a plastic sack, and its mouth 4 and fins 5 to 7 are provided with a plurality of holes 10 for causing sea water to flow through it. In the mouth 4 of the model 1, a ring 11 is fitted, so that the mouth 4 is held open. The dorsal fin 6 of the model 1 accommodates a float 12, and the body accommodates a weight 13 (shown as a lead rope in the embodiments).

As an example, the model 1 has a length of 3.5 to 5 meters and a width of 1.5 to 2 meters and is foldable.

In this embodiment, the model 1 is tugged by the fishing boat 3 and moved at a suitable speed (e.g., 2 to 5 knots) in a fishing area. As a consequence, the model 1 is caused to swell by the pressure of sea water entering through the mouth 4, so that the model entirely sinks into the sea. The sea water entering the model 1 is discharged to the outside through the plurality of holes 10. With this flow of sea water passing through the model 1, the model 1 floats just like a whale shark. The moving model 1, particularly the stripes pattern 9 thereof, causes visual reaction of skipjacks 14 in a near-by shoal, so that a shoal around the model shark forms following the model 1 of whale shark as shown in FIG. 1. When such a shoal of skipjacks 14 is formed, the speed of the boat is reduced, and pole-and-line fishing is performed by throwing lines toward the shoal. The shoal once formed does not readily vanish, so that it is possible to fish skipjacks in the same place for an extended period of time.

In the above embodiment, skipjacks gather around the model 1, so that there is no need of scattering bait, but raw bait (i.e., sardines) may be scattered in the range of movement of the model 1. In this case, the character to react with bait is stimulated, so that the gathering of fish is more readily obtained.

What is claimed is:

1. A method of causing fish to gather comprising the steps of:
   providing a whale shark model designed with a pattern of spots and stripes to look like a whale shark;
   inserting said whale shark model in water; and
   controlling said whale shark model in order to attract shipjacks or tunnies.

2. The method according to claim 1, wherein said model comprises pectoral, dorsal and caudal fins so that it resembles a whale shark as a whole.

3. The method according to claim 1, wherein said model is formed from a synthetic resin.

4. The method according to claim 1, wherein said model permits flow of sea water therethrough.

5. The method according to claim 1, further including the step of pulling said model through the water by a boat.

* * * * *